(12) United States Patent
Chen et al.

(10) Patent No.: US 8,090,966 B2
(45) Date of Patent: Jan. 3, 2012

(54) POWER MANAGEMENT METHOD FOR A MULTI-MICROPROCESSOR SYSTEM

(75) Inventors: Chien-Liang Chen, Hsinchu Hsien (TW); Chih Hao Hu, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 387 days.

(21) Appl. No.: 12/350,724

(22) Filed: Jan. 8, 2009

(65) Prior Publication Data
US 2009/0217069 A1 Aug. 27, 2009

(30) Foreign Application Priority Data

Feb. 26, 2008 (TW) ................................ 97106692 A

(51) Int. Cl.
*G06F 1/00* (2006.01)
*G06F 1/26* (2006.01)
*G06F 1/32* (2006.01)

(52) U.S. Cl. ........ 713/300; 713/320; 713/322; 713/324; 713/500

(58) Field of Classification Search .................. 713/300, 713/310, 320, 321, 322, 323, 324, 340, 375
See application file for complete search history.

(56) References Cited

U.S. PATENT DOCUMENTS

| 6,405,320 B1* | 6/2002 | Lee et al. | 713/300 |
| 2002/0152407 A1* | 10/2002 | Alia et al. | 713/300 |
| 2004/0032414 A1* | 2/2004 | Jain et al. | 345/502 |
| 2006/0129861 A1* | 6/2006 | Kee et al. | 713/323 |
| 2006/0271797 A1* | 11/2006 | Ginggen et al. | 713/300 |

OTHER PUBLICATIONS

Taiwan Intellectual Property Office, "Office Action", Jun. 21, 2011, Taiwan.

* cited by examiner

*Primary Examiner* — Thomas Lee
*Assistant Examiner* — Samantha Hoang
(74) *Attorney, Agent, or Firm* — WPAT., P.C.; Justin King

(57) ABSTRACT

A power management method for a multi-microprocessor system is provided. The multi-microprocessor system comprises a first microprocessor and a second microprocessor. The power management method comprises steps of receiving a power down instruction; transmitting a power down notice signal to the first microprocessor from the second microprocessor, transmitting a reply signal from the first microprocessor to the second microprocessor in response to the power down notice signal, and turning off power of the first microprocessor by the second microprocessor.

8 Claims, 3 Drawing Sheets

POWER MANAGEMENT METHOD FOR A MULTI-MICROPROCESSOR SYSTEM

FIELD OF THE INVENTION

The present invention relates to a microprocessor system, and more particularly, to a power management method for a multi-microprocessor system.

BACKGROUND OF THE INVENTION

A microprocessor is capable of performing operations such as arithmetic operations, logical operations, and circuit control operations. An operation of man-machine interface becomes more convenient when microprocessors are applied in electronic products. For example, microprocessors are provided inside televisions, video recorders, and video players.

In the process of developing microprocessors, microprocessors are low-level 8-bit designs at the beginning. Along with the advance of science and technology, high-level 16-bit and 32-bit microprocessors have been developed. The application areas of microprocessors become wider and more extensive. Therefore, the applications of microprocessors can be found in toys, household appliances, vehicles, consumer electronics products, and so on.

However, under diversified application circumstances, microprocessors often work in conjunction with a high operating clock frequency in order to execute operating systems and support several function engine circuits, thus microprocessors are obviously not energy efficient. Therefore, the present invention provides a power management method to reduce power consumption of a multi-microprocessor system.

SUMMARY OF THE INVENTION

The present invention relates to a power management method for a multi-microprocessor system, in which a second microprocessor is used for turning off power of a first microprocessor in order to reduce power consumption of the system.

According to a first aspect of the present invention, a power management method for a multi-microprocessor system is provided. The multi-microprocessor system comprises a first microprocessor and a second microprocessor. The power management method comprises steps of receiving a power down instruction; transmitting a power down notice signal from the second microprocessor to the first microprocessor; transmitting a reply signal from the first microprocessor to the second microprocessor in response to the power down notice signal, and turning off power of the first microprocessor by the second microprocessor.

According to another aspect of the present invention, a power management method for a multi-microprocessor system is further provided. The multi-microprocessor system comprises a first microprocessor, a second microprocessor, a memory, and a clock generator. The power management method for a multi-microprocessor system comprises steps of: receiving a power on instruction by the second microprocessor; providing power to the clock generator for generating a clock signal; loading a program code to be executed by the first microprocessor into the memory; providing power and the clock signal to the first microprocessor and turning on the first microprocessor by a start signal.

According to another aspect of the present invention, a multi-microprocessor system is provided. The multi-microprocessor system comprises: a plurality of function units for performing a plurality of functions; a first microprocessor, for controlling the plurality of function units; and a second microprocessor, for controlling a power state of the first microprocessor.

A preferred embodiment of the present invention will become more readily apparent to those ordinarily skilled in the art after reviewing the following detailed description and accompanying drawings as follows.

DETAILED DESCRIPTION OF THE PREFERRED EMBODIMENT

Figure 1:
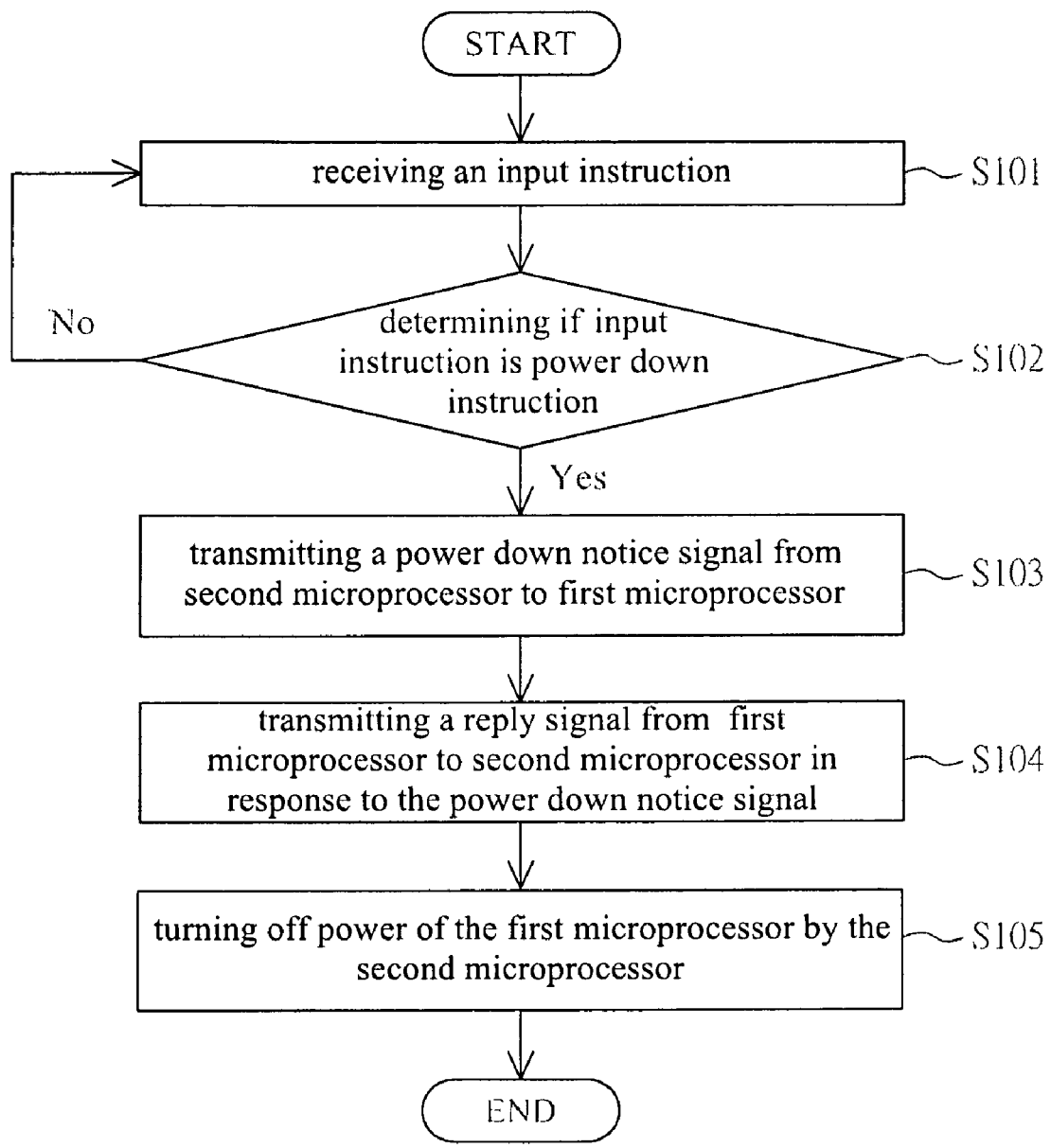
FIG. 1 shows a flow chart of a power management method for a multi-microprocessor system which turns to standby state in accordance with a preferred embodiment of the present invention.

A power management method for a multi-microprocessor system according to a preferred embodiment of the present invention is provided. The multi-microprocessor system comprises a first microprocessor and a second microprocessor. Referring to FIG. 1, FIG. 1 shows a flow chart of a power management method for a multi-microprocessor system which turns to standby state in accordance with a preferred embodiment of the present invention. The power management method of the preferred embodiment includes following steps. In step S101, receiving an input instruction is performed. In step S102, determining whether the input instruction is a power down instruction, and executing step S103 when the input instruction is the power down instruction are performed. In step S103, transmitting a power down notice signal from the second microprocessor to the first microprocessor is performed. In step S104, transmitting a reply signal from the first microprocessor to the second microprocessor in response to the power down notice signal is performed. In step S105, turning off power of the first microprocessor by the second microprocessor is performed.

Figure 2:
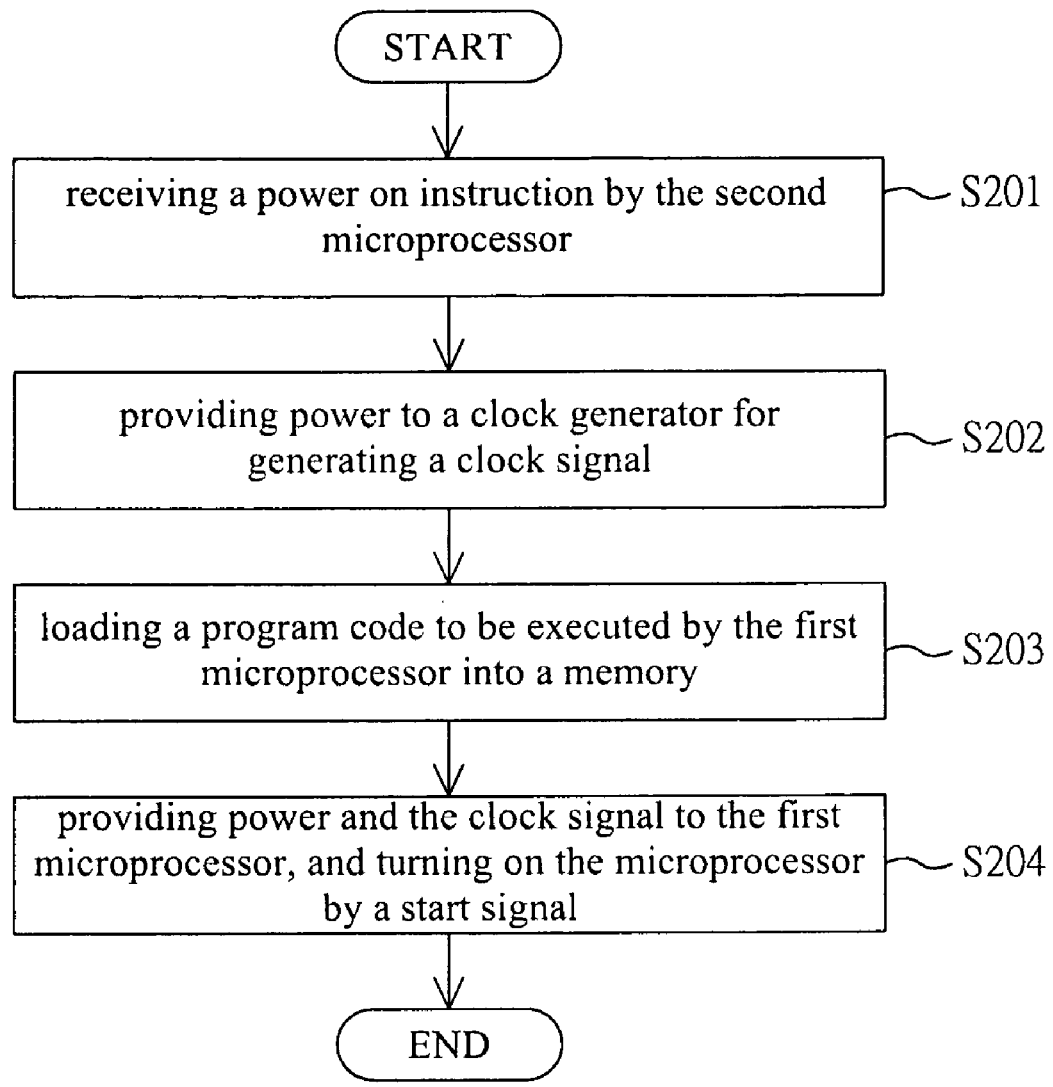
FIG. 2 shows a flow chart of a power management method for a multi-microprocessor system which turns to normal operating state from standby state in accordance with a preferred embodiment of the present invention.

When the multi-microprocessor system wants to return normal operation state from standby state, the power management flow is as shown in FIG. 2. In step S201, receiving a power on instruction by the second microprocessor is performed. In step S202, providing power to a clock generator for generating a clock signal is performed. In step S203, loading a program code to be executed by the first microprocessor into a memory is performed. In step S204, providing power and the clock signal to the first microprocessor, and turning on the microprocessor by a start signal is performed.

Figure 3:
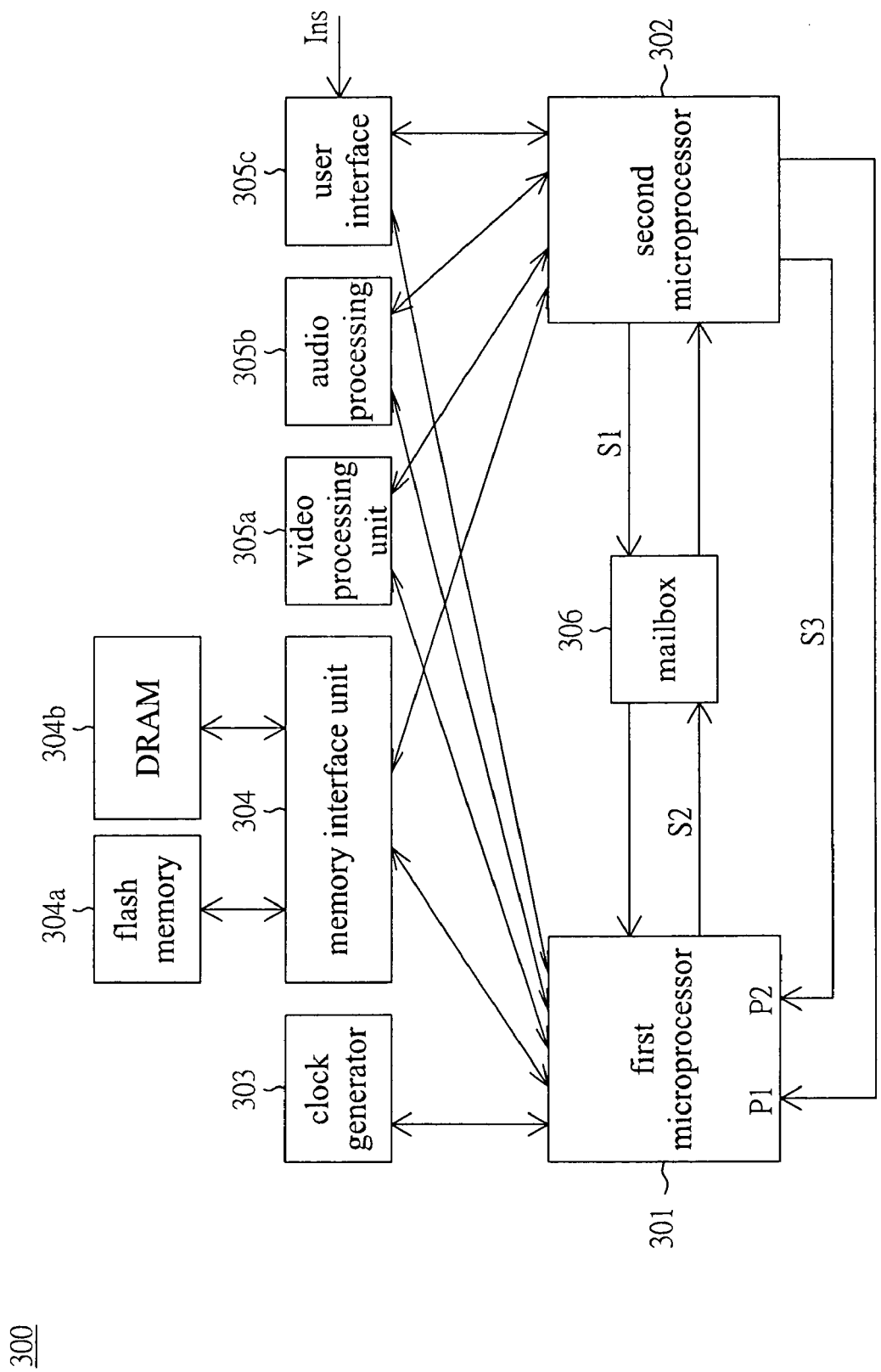
FIG. 3 shows a block diagram of a multi-microprocessor system in accordance with a preferred embodiment of the present invention.

The process of the multi-microprocessor system turning to standby state from normal operation state is further described in the following. Referring to FIG. 3, FIG. 3 shows a circuit block diagram of a multi-microprocessor system. The multi-microprocessor system 300 comprises a first microprocessor 301, a second microprocessor 302, a clock generator 303, a memory interface unit 304 and several function units.

When the multi-microprocessor system 300 receives an input instruction Ins which is subsequently determined to be a power down instruction, the second microprocessor 302 transmits a power down notice signal S1 to the first microprocessor 301. In response to the power down notice signal S1, the first microprocessor 301 transmits a reply signal S2 is to the second microprocessor 302. After receiving the reply signal S2, the second microprocessor 302 turns off power of the first microprocessor 301, then the multi-microprocessor system 300 turns to standby state for the purpose of power saving.

A mailbox 306 or interrupt service, for example, is used by the first microprocessor 301 for communicating with the second microprocessor 302. The preferred embodiment of the present invention employs the mailbox 306 for illustrative purposes. The mailbox 306 stores signals which are transmitted between the first microprocessor 301 and the second microprocessor 302, such as the foregoing power down notice signal S1 and the reply signal S2. Communication between the first microprocessor 301 and the second microprocessor 302 is accomplished by accessing contents of the mailbox 306.

When the second microprocessor 302 wants to turn off power of the first microprocessor 301, the second microprocessor 302 uses the power down bit P1 of the first microprocessor 301, for example, for turning off the power of the first microprocessor 301.

The function units of the multi-microprocessor system 300 are used for performing predetermined functions respectively. According to the preferred embodiment of the present invention, for example, the function units include a video processing unit 305a and an audio processing unit 305b. When the input instruction Ins is a power down instruction, the multi-microprocessor system 300 turns off most of the function units. In an embodiment, the function units are controlled by the first microprocessor 301 and the second microprocessor 302. Therefore, when the multi-microprocessor system 300 turns to standby state, either the first microprocessor 301 or the second microprocessor 302 turns off the function units for further reducing power consumption of the system.

The multi-microprocessor system 300, for example, further includes a user interface 305c, and the input instruction Ins comes from a user control device like an infrared-controlled device or a keypad. The input instruction Ins is received by the user interface 305c. The multi-microprocessor system 300 doesn't turn off the user interface 305c when entering standby state. As a result, the user interface 305c keeps operating normally while the first microprocessor 301 is turned off. Accordingly, when the first microprocessor 301 is turned off, the second microprocessor 302 receives the input instruction Ins from the infrared-controlled device or the keypad via the user interface 305c.

When the first microprocessor 301 is turned off, the multi-microprocessor system 300 can reduce the operation clock frequency of the second microprocessor 302 for further reducing power consumption of the system. When the first microprocessor 301 is turned off, the second microprocessor 302 operating at low frequency still can receive the input instruction Ins from the infrared-controlled device or the keypad via the user interface 305c.

The first microprocessor 301 is preferably a high-level microprocessor, while the second microprocessor 302 is preferably a low-level microprocessor. That means the processing speed of the first microprocessor 301 is higher than the processing speed of the second microprocessor 302. The first microprocessor 301 preferably executes an operation system of the multi-microprocessor system 300.

In this embodiment, when the system turns to standby state, the low-level second microprocessor 302 keeps operating for processing the input instruction Ins received during the standby state. Power of the first microprocessor 301 is turned off, therefore this embodiment effectively reduces power consumption of the multi-microprocessor system 300. Moreover, the multi-microprocessor system 300 further reduces power consumption of the system by means of turning off most of the function units and reducing the operation clock frequency of the second microprocessor 302.

Steps for recovering the multi-microprocessor system 300 from standby state back to normal operating state are illustrated in detail as follows. When the input instruction Ins is a power on instruction, the multi-microprocessor system 300 recovers from standby state back to normal operating state. The power on instruction, for example, is generated by the infrared-controlled device or the keypad and received by the user interface 305c. And then the power on instruction received is transmitted to the second microprocessor 302.

The multi-microprocessor system 300 further comprises a memory and a storage unit both coupled to a memory interface unit 304. The memory, for example, is a Dynamic Random Access Memory (DRAM); and the storage unit, for example, is a flash memory 304a.

When the second microprocessor 302 receives the power on instruction, the second microprocessor 302 enables the power to be provided to the clock generator 303 in order to generate a clock signal. After that, the second microprocessor 302 loads a program code to be executed by the first microprocessor 301 from the flash memory 304a into the DRAM 304b. When power and the clock signal generated by the clock generator 303 are received by the first microprocessor 301, the second microprocessor 302 transmits a start signal S3 to the first microprocessor 301 so as to turn on the first microprocessor 301 and recover standby state back to normal operating state. When the microprocessor 301 is turned on, the microprocessor reads the program code in the DRAM 304b so as to perform normal operations. The start signal S3, for example, is transmitted to an enable bit P2 of the first microprocessor 301, so as to turn on the first microprocessor 301.

The first microprocessor 301 and the second microprocessor 302 access the DRAM 304b and the flash memory 304a via the memory interface unit 304. In the foregoing steps of loading the program code into the memory, the second microprocessor 302 first enables the memory interface unit 304 for returning to the normal operation. Next, the program code to be executed by the first microprocessor 301 and stored in the flash memory 304a, is loaded into the DRAM 304b via the memory interface unit 304 by the second microprocessor 302, in order to facilitate the first microprocessor 301 to read the program code stored in the DRAM 304 and operate normally.

Comparison of this embodiment and a conventional system which has only one microprocessor shall be discussed below. In the conventional system, the microprocessor operates normally only by use of a boot loader, which automatically loads the program code to be executed into a DRAM. However, the procedure is rather time consuming. In this embodiment, the second microprocessor 302 is used for loading the program code to be executed by the first microprocessor 301 into the DRAM 304b so as to allow the first microprocessor 301 to operate normally. According to this embodiment, the second microprocessor 302 is used for loading the program code, such that the first microprocessor 301 which is turned on enters the normal operating mode quickly, thereby improving efficiency of the system.

When the first microprocessor 301 recovers to normal operating state, via the first microprocessor 301 or the second microprocessor 302, the multi-microprocessor system 300 further turns on the function unit 304 originally having been turned off. In addition, the operation clock frequency of the second microprocessor can be raised, in order to make the multi-microprocessor system 300 recover to normal operating state.

The multi-microprocessor system of the present invention can be applied in an electronic device which has two or more microprocessors, such as a digital television and a multimedia player.

The foregoing embodiment illustrates turning off or on the first microprocessor 301 by way of receiving the input instruction from the infrared-controlled device or the keypad as an example. However, the example should not be construed as limiting. For instance, when the multi-microprocessor system 300 doesn't receive the input signal like a video signal within a predetermine time period, the multi-microprocessor system 300 may also generate a power down instruction for turning off the first microprocessor 301. The current invention can turn the multi-microprocessor system 300 to standby state by setting a timer, or turn the multi-microprocessor system 300 to standby state when a DVD player ends or the television video signal is interrupted. When other abnormal situations appear, power consumption is reduced by way of turning the multi-microprocessor 300 to standby state.

In addition, besides using the mailbox as a media to transmit signals or interrupting service program for communicating with the second microprocessor 302, the first microprocessor 301 may also use other methods for transmitting signals to accomplish the communication.

Further, the video processing unit 305a comprises a video decoder and/or a demodulation, for example. The audio process unit 305b comprises a digital signal processor and/or an audio decoder, for example. The embodiment adopts two function units of video and audio devices as an example, but the example should not be construed as limiting. The multi-microprocessor system 300 further may comprise other similar function units such as a function unit for electronic program guide.

The multi-microprocessor system disclosed in accordance with the embodiment of the present invention, the second microprocessor turns off power of the first microprocessor to reduce power consumption of the system when turning to power saving mode. In addition, most of the function units are turned off and the operation clock frequency of the second microprocessor is reduced for reducing power consumption of the system effectively. Furthermore, using the second microprocessor to activate the first microprocessor also minimizes starting time and improves efficiency of the system.

In summary, an embodiment of the present invention is disclosed as above, but the foregoing examples should not be construed as limiting. Other variations and modifications will be apparent to persons skilled in the art within the spirit and scope of the appended claims which are to be accorded with the broadest interpretation so as to encompass all such modifications and similar structures.

What is claimed is:

1. A power management method for a multi-microprocessor system which comprises a first microprocessor, a second microprocessor, and a plurality of function units for performing a plurality of predetermined functions, respectively, the plurality of function units being controlled by the first microprocessor and second microprocessor, comprising the steps of:

receiving a power down instruction indicating the multi-microprocessor system being going to enter a standby state;

transmitting a power down notice signal from the second microprocessor to the first microprocessor;

transmitting a reply signal from the first microprocessor to the second microprocessor in response to the power down notice signal;

turning off power of the first microprocessor by the second microprocessor; and reducing an operating clock frequency of the second microprocessor when the multi-microprocessor system enters the standby state.

2. The power management method as claimed in claim 1, further comprising the step of:

turning off the function units.

3. The power management method as claimed in claim 1, wherein the plurality of function units comprise a video processing unit and an audio processing unit.

4. The power management method as claimed in claim 2, wherein the multi-microprocessor system further comprises a user interface, which is not turned off when the multi-microprocessor system is in a standby state.

5. The power management method as claimed in claim 1, wherein the power down instruction is generated when the multi-microprocessor system doesn't receive an input signal within a predetermine time period.

6. The power management method as claimed in claim 1, wherein the power down instruction is received from a user control device.

7. The power management method as claimed in claim 6, wherein, when the first microprocessor is turned off, the second microprocessor receives the power down instruction from the user control device via a user interface.

8. The power management method as claimed in claim 1, wherein, the first microprocessor's processing speed is higher than the second microprocessor's processing speed.

* * * * *